United States Patent
Nishijima (10) Patent No.: US 9,136,770 B2
(45) Date of Patent: Sep. 15, 2015

(54) ADAPTER POWER SUPPLY HAVING THERMOELECTRIC CONVERSION ELEMENT

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 260 days.

(21) Appl. No.: 13/962,498

(22) Filed: Aug. 8, 2013

(65) Prior Publication Data

US 2014/0078785 A1   Mar. 20, 2014

(30) Foreign Application Priority Data

Sep. 20, 2012   (JP) ................................. 2012-207646

(51) Int. Cl.
H02M 3/335   (2006.01)
H02M 1/00   (2007.01)

(52) U.S. Cl.
CPC ...... *H02M 3/33576* (2013.01); *H02M 3/33523* (2013.01); *H02M 2001/0045* (2013.01)

(58) Field of Classification Search
CPC ................................................ H02M 3/33576
See application file for complete search history.

(56) References Cited

U.S. PATENT DOCUMENTS

| 6,143,975 | A * | 11/2000 | Liao et al. ...................... 136/201 |
| 2005/0268955 | A1 * | 12/2005 | Meyerkord et al. ........... 136/205 |
| 2007/0253227 | A1 * | 11/2007 | James et al. .................... 363/19 |
| 2009/0283124 | A1 * | 11/2009 | Seo ................................ 136/201 |
| 2011/0128698 | A1 * | 6/2011 | Nishioka et al. ......... 361/679.46 |
| 2011/0215762 | A1 * | 9/2011 | Hasebe et al. ................ 320/134 |
| 2013/0141078 | A1 * | 6/2013 | Takei et al. .................... 324/106 |

FOREIGN PATENT DOCUMENTS

| JP | 2011-015570 A | 1/2011 |
| JP | 4628164 B2 | 2/2011 |

* cited by examiner

*Primary Examiner* — Emily P Pham
(74) *Attorney, Agent, or Firm* — Rabin & Berdo, P.C.

(57) ABSTRACT

An adapter power supply of the invention comprises a switching element that performs switching of an input voltage obtained by rectifying an input AC voltage to deliver switched voltage to a primary winding of an isolating transformer, a diode that rectifies a voltage obtained across a secondary winding of the isolating transformer to obtain a DC output voltage, and a thermoelectric conversion element that performs thermoelectric conversion to variably set the DC output voltage corresponding to a temperature difference between a heated temperature of the switching element or the diode and an atmospheric temperature. The thermoelectric conversion element is disposed between a heat sink attached to the switching element or the diode and a package for containing a main body of the adapter power supply.

11 Claims, 7 Drawing Sheets

ADAPTER POWER SUPPLY HAVING THERMOELECTRIC CONVERSION ELEMENT

CROSS-REFERENCE TO RELATED APPLICATION

This application is based on, and claims priority to, Japanese Patent Application No. 2012-207646, filed on Sep. 20, 2012, contents of which are incorporated herein by reference.

BACKGROUND OF THE INVENTION

1. Field of the Invention

The present invention relates to an adapter power supply with reduced power consumption in a standby period.

2. Description of the Related Art

Figure 6:
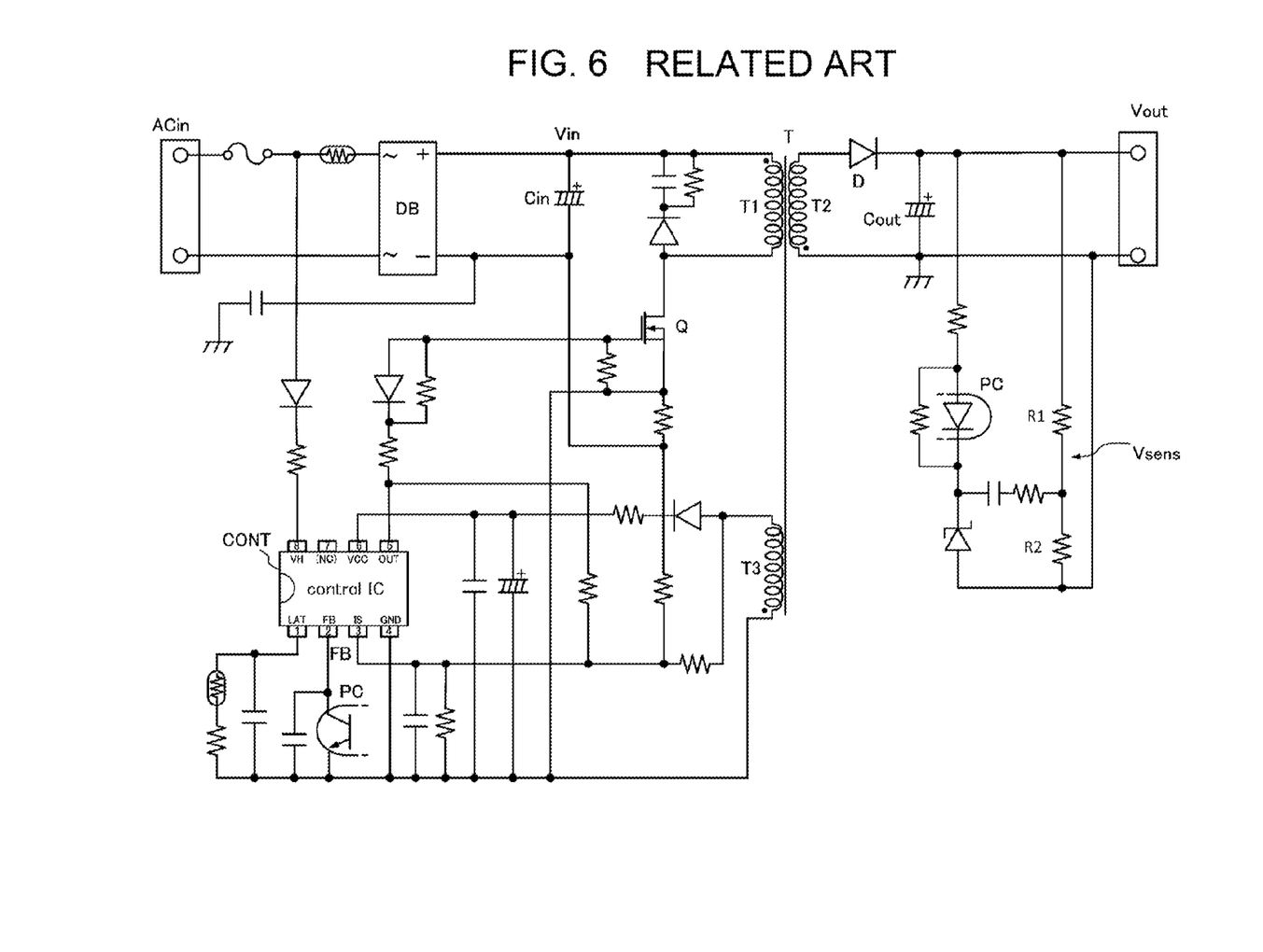
FIG. 6 shows an example of overall construction of a conventionally common adapter power supply.

Adapter power supplies are widely used for obtaining a specified DC output voltage receiving a worldwide input from a commercial AC power source at a voltage of 90 to 264 Vac. The adapter power supplies are used for external power supplies to supply DC voltage to electronic devices such as small-sized television sets, printers, and personal computers of a notebook type. Such an adapter power supply has a basic construction as shown in FIG. 6 and comprises: a rectifying circuit DB for rectifying an AC voltage, an isolation transformer T connected to the rectifying circuit DB and having a primary winding T1 and a secondary winding T2, a switching element Q connected in series to the primary winding T1, and a control circuit CONT that is a control IC that performs self-oscillation and switching driving the switching element Q at a specified period. The adapter power supply further comprises in the secondary side, a diode D for rectifying a voltage generated on the secondary winding T2 of the isolation transformer T and an output capacitor Cout for smoothing the rectified voltage to deliver a DC output voltage Vout. Patent Document 1 (identified below), for example, discloses such an adapter power supply.

The information of the DC output voltage Vout is detected by a voltage detecting circuit Vsens provided in the secondary side of the isolation transformer T and is fed back through a photo-coupler PC. The information is specifically an error voltage of the DC output voltage Vout with respect to a reference voltage. The control circuit CONT that is a control IC controls the ON width of the switching element Q corresponding to the error voltage to obtain a constant DC output voltage Vout. The control circuit CONT operates with a driving power source of the voltage that is generated by the switching operation of the switching element Q and appears across the auxiliary winding T3 of the isolation transformer T.

Figure 7:
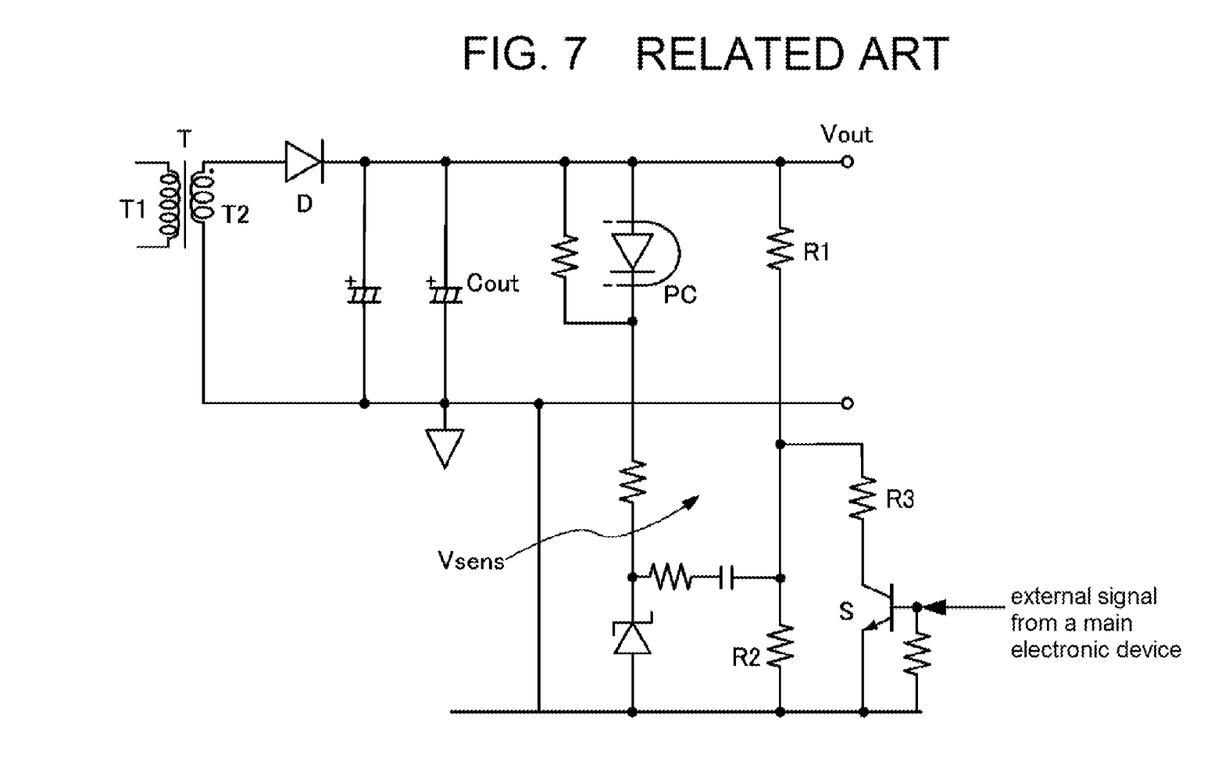
FIG. 7 shows an example of construction of a section for output voltage changeover control installed in the conventional adapter power supply.

Conventional technologies take measures to reduce power consumption during the standby period, in which the DC output voltage of an adapter power supply is changed over, for example, from a rated output voltage of 32 V to a standby period output voltage of 12 V in a period of no load or light load. Specifically, as shown in FIG. 7, a control signal showing an operating or heavy load condition is given from the electronic device to which the adapter power supply concerned supplies DC power, and the control signal turns ON a switch S to deliver a rated output voltage. When the control signal is interrupted in a no load or light load condition, the switch S is turned OFF.

The ON state of the switch S connects the auxiliary resistor R3 to the resistor R2 for output voltage detection in parallel to set a high level of voltage detection condition of the voltage detecting circuit Vsens, thereby setting the DC output voltage Vout at the rating output of 32 V. On the other hand, the OFF state of the switch S disconnects the auxiliary resistor R3 to set a low level of voltage detection condition of the voltage detecting circuit Vsens, thereby setting the DC output voltage Vout at the standby period output voltage of 12 V.

[Patent Document 1]

Japanese Unexamined Patent Application Publication No. 2011-015570

As described above, the power consumption in the adapter power supply is reliably reduced by decreasing the DC output voltage Vout of the adapter power supply under the no load or light load condition. Such control, however, needs to obtain a control signal from the side of the electronic device. In addition, a two-core power cable must be replaced by a three-core power cable including a signal transmission line. Moreover, the electronic device side has to be provided with an interface and a control program to give the control signal to the adapter power supply. Thus, the system construction as a whole becomes complicated.

SUMMARY OF THE INVENTION

The present invention has been made in view of this situation and an object of the present invention is to provide an adapter power supply that reduces a power consumption in a standby period under a no load or light load condition without requiring a burden on the side of electronic device to which the adapter power supply delivers a power.

In order to achieve the above object, an adapter power supply of the present invention comprises a switching element that performs switching of an input voltage obtained by rectifying an input AC voltage to deliver switched voltage to a primary winding of an isolating transformer, a diode that rectifies a voltage obtained across a secondary winding of the isolating transformer to obtain a DC output voltage, and a thermoelectric conversion element that performs thermoelectric conversion to variably set the DC output voltage corresponding to a temperature difference between a heated temperature of the switching element or the diode and an atmospheric temperature.

The thermoelectric conversion element may be disposed between a heat sink attached to the switching element or the diode and a package for containing a main body of the adapter power supply including a major component of the switching element, and generate a voltage corresponding to the temperature difference between the package and the heat sink, which is a temperature difference between the heated temperature of the switching element or the diode and the atmospheric temperature.

The switching element is switching-controlled according to a feedback voltage delivered by a voltage detecting circuit for detecting the DC output voltage. The thermoelectric conversion element performs ON/OFF-controlling of a switch that changes a resistance value of a voltage dividing resistor circuit for output voltage detection provided in the voltage detecting circuit to change a voltage detecting characteristic of the voltage detecting circuit according to the voltage generated corresponding to the temperature difference to control the feedback voltage, and lowers the DC output voltage when the voltage generated corresponding to the temperature difference does not reach a predetermined threshold value.

Specifically, the thermoelectric conversion element sufficiently exhibits a thermoelectric conversion characteristic that a voltage of at least 1 volt is generated with a temperature difference of 15 to 20° C.

An adapter power supply having a construction as stated above directs attention to the fact that the heated temperature of the switching element in the primary side of the isolation transformer or the heated temperature of the diode in the secondary side of the isolation transformer decreases in a no load period or a light load period and the temperature difference of these heated temperatures from the atmospheric temperature becomes smaller. Using a thermoelectric conversion element that generates a voltage corresponding to the temperature difference, the adapter power supply changes the output voltage thereof corresponding to the output voltage of the thermoelectric conversion element.

Consequently, such an adapter power supply need not to receive any control signal from the electronic device to which the adapter power supply supplies a power. Therefore, a three-core power cable need not be used, and the electronic device is not forced to bear an excessive burden to control the interface with the power supply. Because the thermoelectric conversion element is simply disposed between the heat sink attached to the switching element or the diode and the package for containing the main body of the adapter power supply, the adapter power supply of the invention reduces the power consumption during a standby period readily and effectively.

DETAILED DESCRIPTION OF THE INVENTION

The following describes an example of adapter power supply according to an embodiment of the present invention with reference to accompanying drawings.

The adapter power supply of the embodiment is basically similar to the conventional one shown in FIG. 6 and comprises: a rectifying circuit DB for rectifying an input AC voltage ACin and delivering a rectified input voltage Vin, an isolation transformer T connected to the rectifying circuit DB and having a primary winding T1 and a secondary winding T2, a switching element Q connected in series to the primary winding T1 conducting switching the rectified input voltage Vin and giving the switched voltage to the primary winding T1. The adapter power supply further comprises in the secondary side, a diode D for rectifying a voltage obtained on the secondary winding T2 and an output capacitor Cout for smoothing the rectified voltage to deliver a specified DC output voltage Vout.

A voltage detecting circuit Vsens including series-connected voltage dividing resistors R1 and R2 detects the DC output voltage Vout obtained across the output capacitor Cout. The voltage detecting circuit Vsens feeds back an error voltage of the DC output voltage Vout from a reference voltage to a control circuit CONT, which is a control IC, through a photo-coupler PC. The control circuit CONT controls the switching frequency or ON width of the switching element Q according to the fed back information of the DC output voltage Vout. Thus, the DC output voltage Vout is controlled to be the specified voltage value.

Figure 1:
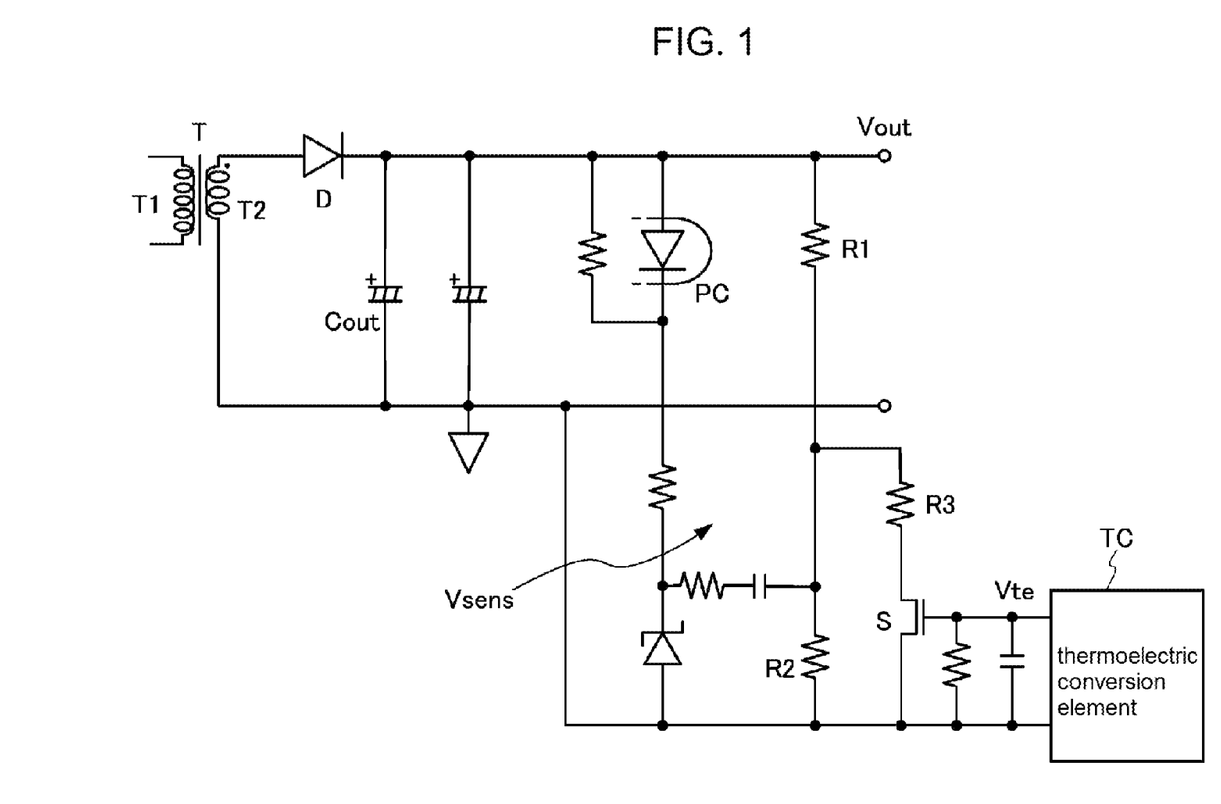
FIG. 1 shows a schematic construction of a section for output voltage changeover control, which is a characteristic part of an adapter power supply according to an embodiment of the present invention.

Referring now to FIG. 1, the adapter power supply of the invention basically having the construction described above is characterized in that a thermoelectric conversion element TC is provided as a driving source for ON/OFF control of a switch S that selectively connects an auxiliary resistor R3 in parallel to a resistor R2 for output voltage detection. Specifically, an output voltage Vte of the thermoelectric conversion element TC is given to the gate of the switch S, which can be a MOS-FET, and the switch S is ON controlled to connect the auxiliary resistor R3 in parallel to the resistor R2. Thus, the DC output voltage Vout is changed over.

Figure 2:
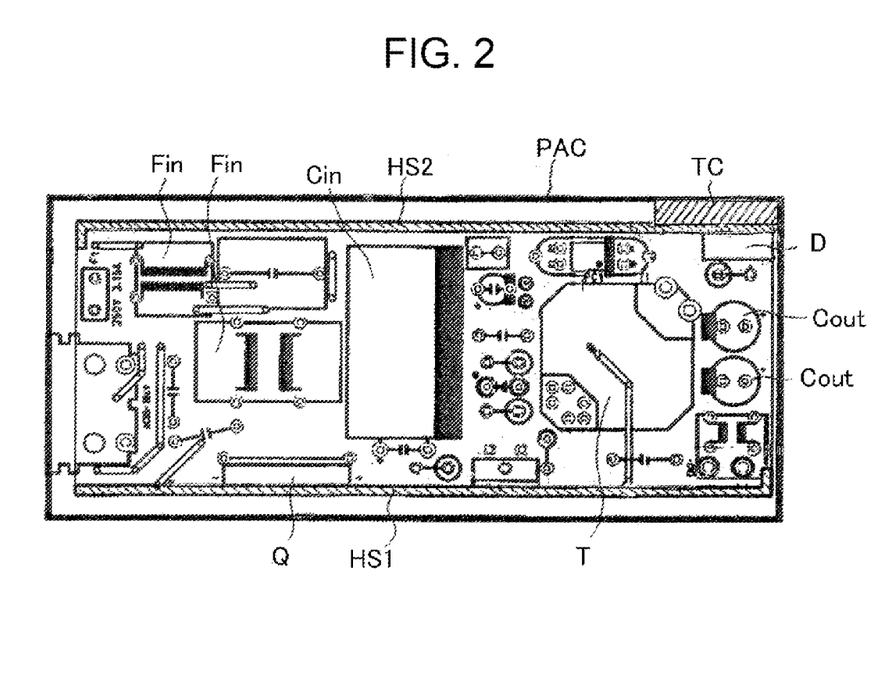
FIG. 2 shows an example of a layout of an adapter power supply according to an embodiment of the invention.

As shown in the layout example of an adapter power supply of FIG. 2, the thermoelectric conversion element TC is disposed between a heat sink HS1 or another heat sink HS2 and the package PAC, wherein the heat sink HS1 is attached to the switching element Q in the primary side of the isolation transformer T, the heat sink HS2 is attached to the diode D in the secondary side of the isolation transformer T, and package PAC is made of plastic material and contains the main body of the adapter power supply. The thermoelectric conversion element TC generates a voltage Vte corresponding to the temperature difference between the heat sink HS1 or HS2 and the package PAC. More specifically, the voltage Vte is generated corresponding to the temperature difference between the heated temperature of the switching element Q or the diode D transferred through the heat sink HS1 or the heat sink HS2 and the atmospheric temperature transferred through the package PAC.

There are mounted on a circuit board shown in FIG. 2 the switching element Q and the diode D. FIG. 2 also designates the mounting areas of an input capacitor Cin, input noise filter Fin, the transformer T, and an output capacitor Cout on the circuit board. In addition to these main components, there are of course mounted other electronic parts composing the adapter power supply on the circuit board of FIG. 2.

Figure 3:
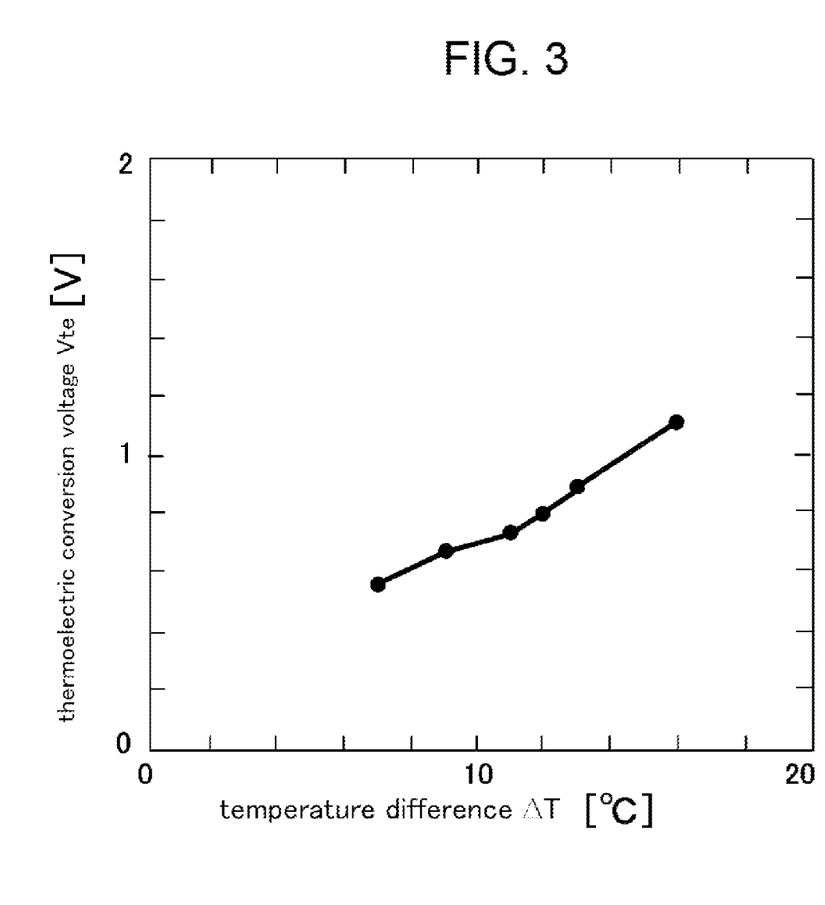
FIG. 3 shows an example of a characteristic of thermoelectric conversion voltage versus temperature difference of a thermoelectric conversion element.

The thermoelectric conversion element TC has a structure of junction between an N-type semiconductor and a P-type semiconductor and generates a voltage Vte corresponding to a temperature difference $\Delta T$ between the P-N junctions according to the Seebeck effect. The thermoelectric conversion element TC uses a thermoelectric conversion characteristic wherein the generated voltage Vte increases with increase in the temperature difference $\Delta T$. FIG. 3 shows an example of a thermoelectric conversion characteristic. A thermoelectric conversion element used for ON-controlling the switch S exhibits a thermoelectric conversion characteristic such that a voltage Vte higher than 1 volt is generated with a temperature difference of 15 to 20° C.

The heated temperature of the switching element Q and the diode D in the adapter power supply reaches about 70 to 80° C. during the rated output power operation, although the temperature varies depending on the specification and the operation condition. Thus, a temperature difference between the heat sink HS1 or HS2 and the package PAC can be about 30 to 40° C. Correspondingly, an output voltage Vte of 1.5 to 2 V can be obtained from the thermoelectric conversion element TC during the rated output power operation. This output voltage Vte is sufficiently high to ON-drive the switch S of a FET.

When the load on the adapter power supply becomes light or no load, the switching operation of the switching element Q becomes less active to lower the heated temperature of the switching element Q and the diode D, which decreases the temperature difference ΔT that the thermoelectric conversion element TC undergoes and the output voltage Vte of the thermoelectric conversion element TC decreases. As a result, the switch S becomes unable to maintain the ON state thereof. The turning OFF of the switch S separates the auxiliary resistor R3 from the voltage detecting circuit. Therefore, the DC output voltage Vout is set at a low value, for example, 12 V.

A specific example of voltage detecting circuit Vsens is given below. In the case of a reference voltage Vref for output voltage setting of 2.5 V, the resistors R1 of 285 kΩ and R2 of 75 kΩ for output voltage detection, and the auxiliary resistor R3 of 35 kΩ, the combined resistance R2//R3 of the resistor R2 and the auxiliary resistance R3 that are connected in parallel is 24 kΩ. When the output voltage Vte of the thermoelectric conversion element TC exceeds the operation threshold voltage Vgsth, Vte≥Vgsth, the ON operation of the switch S results:

$$Vout/Vref=[R1+(R2//R3)]/(R2//R3),$$

which leads to:

$$Vout=2.5\times(1+285/24)=32(V)$$

When the output voltage Vte of the thermoelectric conversion element TC does not reach the operation threshold voltage Vgsth, Vte<Vgsth, the OFF operation of the switch S results:

$$Vout=2.5\times(1+285/75)=12(V)$$

Figure 4:
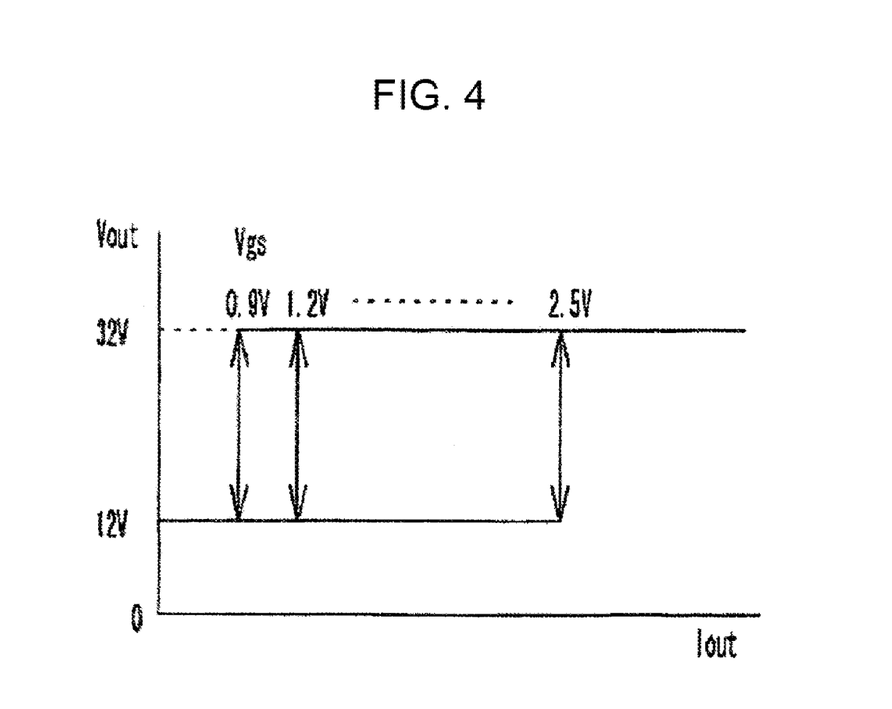
FIG. 4 shows a changeover mode of the output voltage between a normal operation period and a standby period.

Consideration is now given to a low voltage driven MOS-FET used for the switch S. There are such MOS-FETs with the operation threshold voltage Vgsth of 0.9 V, 1.2 V, 1.5 V, 1.8 V, and 2.5 V in the market. Thus, by selecting from these MOS-FETs with various values of operation threshold voltages Vgsth for the switch S, a changeover point of the output voltage can be appropriately adjusted corresponding to the load condition as shown in FIG. 4.

The heat generated in the switching element Q and the diode D varies with the current Iout flowing through the switching element Q and the diode D. The temperature of the heat sink HS1 and the heat sink HS2 caused by heat generation in the switching element Q and the diode D changes rapidly in the heating up process and slowly in the cool down process under a natural cooling condition. As a consequence, the DC output voltage Vout is actually changed over in a mode with certain hysteresis around the operation threshold voltage Vgsth.

Figure 5:
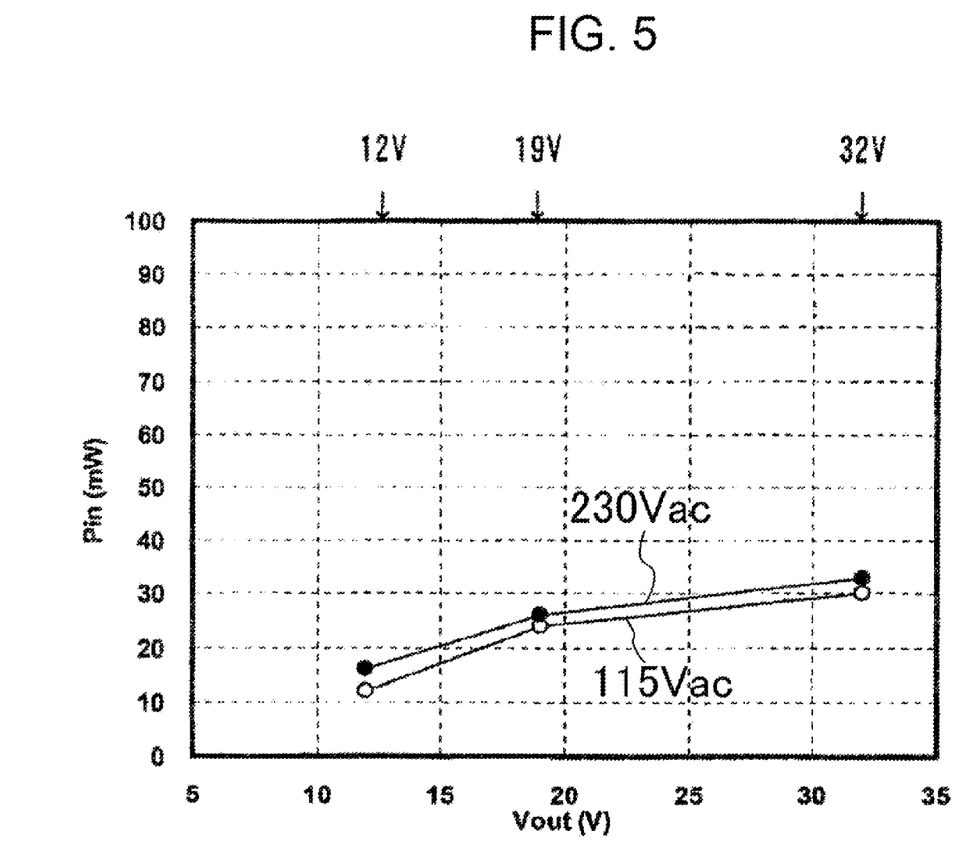
FIG. 5 shows the effect of power consumption reduction owing to decrease in the output voltage in a standby period.

FIG. 5 shows a relationship between the output voltage Vout and the input power Pin in the adapter power supply having the construction described above. By changing over the output voltage Vout to 12 V in the no load or light load condition, for example, the input power Pin is substantially reduced as compared with the period of the rating output with the output voltage Vout of 19 V to 32 V. The adapter power supply determines the load condition by means of its own circuit based on the heated temperature of the switching element Q and the diode D and changes over the output voltage Vout to a lower value in a no load or light load period without obtaining a control signal from the side of the electronic device to which the adapter power supply delivers a power. Therefore, the power consumption during the standby period is reduced readily and effectively.

Because the adapter power supply of the embodiment need not to obtain a control signal from the electronic device to which the adapter power supply delivers a power, it is not necessary to use a three-core power cable. The adapter power supply of the embodiment does not force the electronic device to bear a burden of generating and delivering a control signal. Because the side of the electronic device requires no change in the construction thereof, the adapter power supply of the invention can be readily applied in combination with existing electronic devices.

The present invention is not limited to the embodiment described thus far. The output voltage Vout of the adapter power supply, for example, is any value that sufficiently meets the specification of the electronic device that receives power from the adapter power supply, and is of course not limited to 32 V as mentioned previously. The DC output voltage Vout that is set for the no load or light load period is also sufficiently determined to a minimum voltage that assures operation of the adapter power supply. The present invention can be carried out with various modifications within the scope and spirit of the invention.

DESCRIPTION OF SYMBOLS

Q: switching element
T: isolation transformer
D: diode
Cout: output capacitor
Vsens: voltage detecting circuit
PC: photo-coupler
CONT: control circuit
R1, R2: resistor
S: switch that can be a MOS-FET
R3: auxiliary resistor
TC: thermoelectric conversion element
HS1, HS2: heat sink

What is claimed is:

1. An adapter power supply comprising:
a switching element that performs switching of an input voltage obtained by rectifying an input AC voltage to deliver switched voltage to a primary winding of an isolating transformer;
a diode that rectifies a voltage obtained across a secondary winding of the isolating transformer to obtain a DC output voltage; and
a thermoelectric conversion element that performs thermoelectric conversion to variably set the DC output voltage corresponding to a temperature difference between a heated temperature of the switching element or the diode and an atmospheric temperature.

2. The adapter power supply according to claim 1, wherein the thermoelectric conversion element is disposed between a heat sink attached to the switching element or the diode and a package for containing a main body of the adapter power supply, the main body including a major component of the switching element, and generates a voltage corresponding to the temperature difference.

3. The adapter power supply according to claim 1, wherein
the switching element is switching-controlled according to a feedback voltage delivered by a voltage detecting circuit for detecting the DC output voltage, and
the thermoelectric conversion element performs ON/OFF-controlling of a switch that changes a voltage detecting characteristic of the voltage detecting circuit according to the voltage generated corresponding to the temperature difference to control the feedback voltage, and lowers the DC output voltage when the voltage generated corresponding to the temperature difference does not reach a predetermined threshold value.

4. The adapter power supply according to claim 3, wherein the thermoelectric conversion element performs ON/OFF-controlling of the switch, the controlling changing a resistance value of a voltage dividing resistor circuit for output voltage detection provided in the voltage detecting circuit.

5. The adapter power supply according to claim 1, wherein the thermoelectric conversion element exhibits a thermoelectric conversion characteristic wherein a voltage of at least 1 volt is generated with a temperature difference of 15 to 20° C.

6. An apparatus, comprising:
a switching device configured to perform switching for an operation of a power supply at an operation frequency; and
a voltage change-over device configured to change an output voltage of the power supply based on a temperature difference between an operation temperature associated with the operation of the power supply at the operation frequency, and a reduced-frequency operation temperature associated with an operation of the power supply at a reduced frequency based on a change in a load of the power supply.

7. The apparatus of claim 6, wherein the voltage change-over device comprises a thermo-electric device configured to change a state of a change-over switch based on the temperature difference.

8. The apparatus of claim 7, wherein the thermo-electric device is configured to
maintain the change-over switch in a state that causes the output voltage to have a value corresponding to the operation of the power supply at the operation frequency while the temperature difference is within a predetermined range, and
change the state of the change-over switch to cause the output voltage to have a value corresponding to the operation of the power supply at the reduced frequency in response to the temperature difference exceeding the predetermined range.

9. The apparatus of claim 8, wherein the thermo-electric device is in contact with a heat communication device configured to communicate the operation temperature and the reduced-frequency operation temperature to the thermo-electric device based at least partly on at least one of a temperature of the switching device or a rectifying device associated with the switching device.

10. The apparatus of claim 9, wherein the thermo-electric device is further in contact with a housing of the power supply.

11. The apparatus of claim 10, wherein the thermo-electric device is configured to output a voltage responsive to a difference in temperature between the heat communication device and the housing to control the state of the change-over switch.

* * * * *